United States Patent
Dorsey

(10) Patent No.: US 8,491,800 B1
(45) Date of Patent: Jul. 23, 2013

(54) MANUFACTURING OF HARD MASKS FOR PATTERNING MAGNETIC MEDIA

(75) Inventor: Paul Dorsey, Los Altos, CA (US)

(73) Assignee: WD Media, LLC, San Jose, CA (US)

( * ) Notice: Subject to any disclaimer, the term of this patent is extended or adjusted under 35 U.S.C. 154(b) by 208 days.

(21) Appl. No.: 13/072,005

(22) Filed: Mar. 25, 2011

(51) Int. Cl.
  *B44C 1/22*  (2006.01)
  *C03C 15/00*  (2006.01)
  *C03C 25/68*  (2006.01)
  *H01L 21/302*  (2006.01)

(52) U.S. Cl.
  USPC ....... 216/22; 216/41; 216/47; 438/3; 438/717

(58) Field of Classification Search
  USPC ............... 216/22, 47, 49, 51; 438/3, 717, 736
  See application file for complete search history.

(56) References Cited

U.S. PATENT DOCUMENTS

| | | | |
|---|---|---|---|
| 4,556,597 A | 12/1985 | Best et al. | |
| 6,086,961 A | 7/2000 | Bonyhard | |
| 6,153,281 A | 11/2000 | Meyer et al. | |
| 6,753,043 B1 | 6/2004 | Kuo et al. | |
| 6,753,130 B1 | 6/2004 | Liu et al. | |
| 6,864,042 B1 | 3/2005 | Kuo et al. | |
| 2004/0209123 A1 | 10/2004 | Bajorek et al. | |
| 2005/0271819 A1 | 12/2005 | Wago et al. | |
| 2008/0007868 A1 | 1/2008 | Nishida et al. | |
| 2008/0180844 A1 | 7/2008 | Takeda et al. | |
| 2009/0123660 A1* | 5/2009 | Inaba et al. | 427/535 |
| 2009/0213497 A1* | 8/2009 | Ono et al. | 360/135 |
| 2009/0214898 A1* | 8/2009 | Hinoue et al. | 428/848.5 |
| 2010/0053813 A1* | 3/2010 | Fukushima et al. | 360/131 |
| 2011/0211272 A1* | 9/2011 | Butler et al. | 360/55 |
| 2012/0052328 A1* | 3/2012 | Sakurai et al. | 428/810 |
| 2012/0170152 A1* | 7/2012 | Sonobe et al. | 360/135 |
| 2012/0237795 A1* | 9/2012 | Sakurai et al. | 428/800 |
| 2012/0276414 A1* | 11/2012 | Maeda et al. | 428/828 |
| 2012/0292285 A1* | 11/2012 | Kontos et al. | 216/12 |

* cited by examiner

*Primary Examiner* — Allan Olsen
*Assistant Examiner* — Margaret D Klunk

(57) ABSTRACT

Embodiments of the present invention relate to systems and methods for designing and manufacturing hard masks used in the creation of patterned magnetic media and, more particularly, patterned magnetic recording media used in hard disk drives (e.g., bit patterned media (BPM)). In some embodiments, the hard mask incorporates at least one layer of Ta (tantalum) and at least one layer of C (carbon) and is used during ion implantation of a pattern onto magnetic media. The hard mask can be fabricated with a high aspect ratio to achieve small feature sizes while maintaining its effectiveness as a mask, is robust enough to withstand the ion implantation process, and can be removed after the ion implantation process with minimal damage to the magnetic media.

16 Claims, 13 Drawing Sheets

355

357

US 8,491,800 B1

MANUFACTURING OF HARD MASKS FOR PATTERNING MAGNETIC MEDIA

TECHNICAL FIELD

This invention relates to the field of disk drives and more specifically, to hard masks for patterning magnetic recording media for disk drives.

BACKGROUND

When manufacturing of patterned magnetic recording media (e.g., bit patterned media (BPM) or discrete track media (DTM)), an ion implantation process may be utilized to transfer the pattern of a patterned resist layer to a magnetic layer of the magnetic recording media. Usually, during such implantation process, a hard mask is disposed over the magnetic layer to allow ion penetration at certain areas of the media's magnetic layer (also known as ion implanted regions) while preventing ion penetration at others (also known as non-ion implanted regions). Those areas of the exposed to the ions are known to exhibit suppressed or substantially reduced magnetic moment in comparison to those areas protected from ions penetration; this difference in magnetic moment result in the pattern magnetic layer.

Typically, for a hard mask to be effective during ion implantation, it must be: (1) capable of stopping the ions from reaching the magnetic layer of the media (which is usually dictated by material composition, density, and mask thickness); (2) extendible to high density or small feature sizes for patterned magnetic recording media (e.g., for BPM, which require a high aspect ratio mask to maintain a thick mask for protection); (3) robust enough to withstand the etching effects of the ion implantation process such that the hard mask is not substantially removed or altered during the ion implantation process; and (4) removable such that after the ion implantation process it can easily removed without damaging the magnetic layer in the process.

Unfortunately, no single conventional masking configuration meets all of these requirements. For instance, when patterning a magnetic layer using ion implantation with nanoimprint lithography (NIL), the resist material used easily etches away during ion implantation, thereby resulting in less sharp transitions in the magnetic layer between areas of the magnetic layer exposed to ions (i.e., ion implanted regions) and areas not exposed to ions (i.e., non-implanted regions). In another example, when a single metal hard mask comprising Ta is used in conjunction with ion implantation, the aspect ratio is usually not extendible to small features, due to the patterned resist thickness decreasing as feature size decreases while the relative etch rates of the resist and Ta are constant. Furthermore, for single metal hard masks that comprise Ta usually can not be removed from the magnetic media without damaging the underlying magnetic layer (the fluorine-based dry etch chemistries required for removal damage the magnetic layer).

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth, such as examples of specific layer compositions and properties, to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Embodiments of the present invention relate to systems and methods for designing and manufacturing hard masks used in the creation of patterned magnetic media and, more particularly, patterned magnetic recording media used in hard disk drives (e.g., bit patterned media (BPM)). In some embodiments, the hard mask incorporates at least one layer of Ta (tantalum) and at least one layer of C (carbon) and is used during ion implantation of a pattern onto magnetic media. Some such Ta/C hard masks are capable of: (1) stopping the ions from reaching the magnetic layer of the magnetic media; (2) being fabricated with high aspect ratio to achieve high density or small feature sizes for patterned magnetic recording media (e.g., for BPM) while maintaining mask effectiveness; (3) withstanding the etching effects of the ion implantation process such that the hard mask is not substantially removed or altered during the ion implantation process; and (4) being removed after the ion implantation without damaging the magnetic layer in the process.

Figure 1:
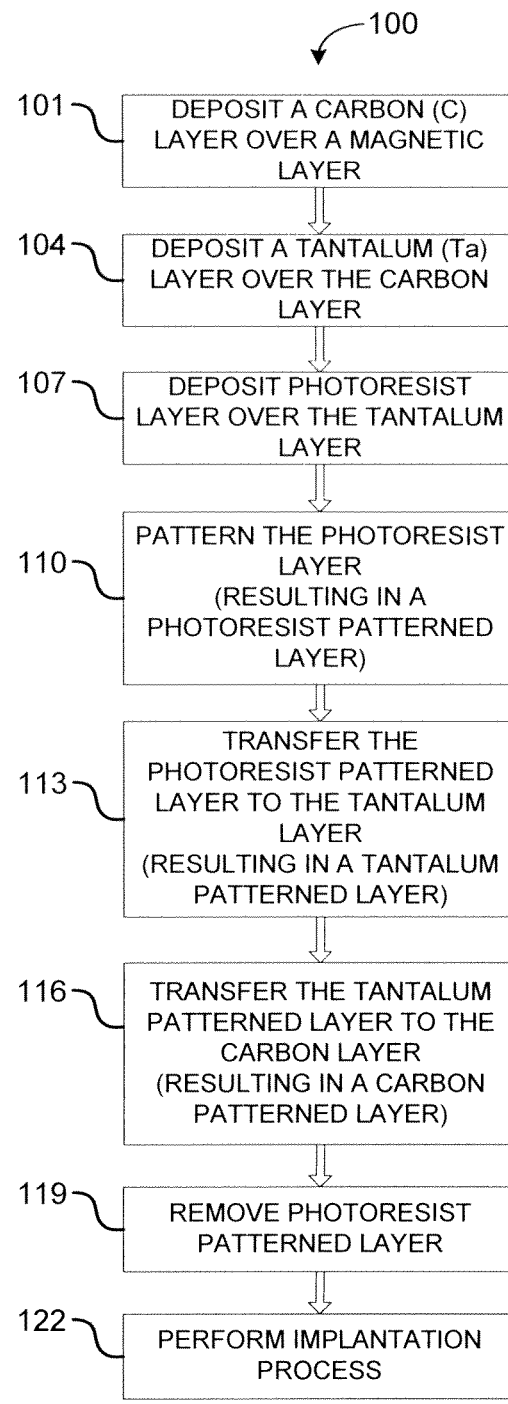
FIG. 1 illustrates a flowchart of a method for manufacturing a magnetic recording medium in accordance with one embodiment of the present invention.

FIG. 1 illustrates a flowchart 100 of an example method for creating magnetic recording media, in accordance with one embodiment, using a single tantalum layer and single carbon layer mask (i.e., single Ta/C hard mask). The illustrated method begins at operation 101 with the deposition of a carbon (C) layer over a magnetic recording layer of a magnetic recording medium. The magnetic recording layer may be over a soft magnetic underlayer (SUL), a non-magnetic interlayer between the magnetic recording layer and SUL, and a bottom substrate. The carbon layer may be deposited using chemical vapor deposition (CVD) and relatively thick (e.g., ~40 nm) in comparison to other layers of the magnetic recording medium. Next, at operation 104, a layer of tantalum (Ta) is deposited over the carbon layer. The tantalum layer may be relatively thin in comparison to the carbon layer and deposited using a sputtering methodology. Tantalum, compared to other materials, exhibits good etch resistance to ion implantation processes. For example, under typical implantation conditions, 1 nm of Ta is removed while at the same implant conditions, 30 nm of photoresist would have been etched away.

Following tantalum deposition, a photoresist layer is deposited and patterned using lithographic techniques at operations 107 and 110 respectively. The lithography technique utilized may be nano-imprint lithography (NIL). In some embodiments, the tantalum layer is sufficiently thin enough to allow thin photoresist layers to be transferred into the tantalum layer without completely etching away the resist, while being sufficiently thick enough to protect the thick carbon layer underneath (i.e., thick enough to be effective as a protective mask for the carbon layer). For example, the tantalum layer may have a thickness between 1 nm and 2 nm. By being able to use thin patterned resist layers, pattern feature sizes can be correspondingly reduced (e.g., <25 nm for BPM), which allows for higher areal density, among other things. The thick carbon layer underlying the relatively the tantalum layer is thick enough to provide good mask protection during the ion implantation process.

Figure 2:
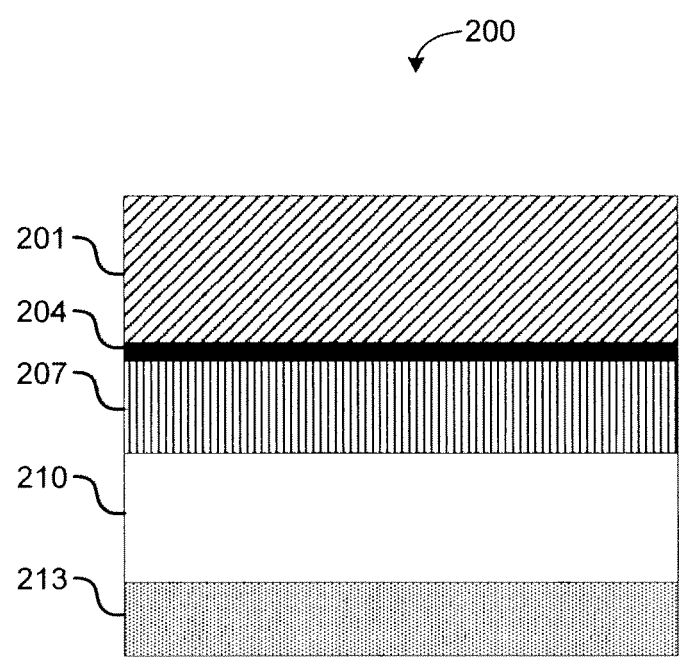
FIGS. 2-8 illustrate a cross-sectional view of a magnetic recording medium being manufactured in accordance with an embodiment of the present invention.
Figure 3:
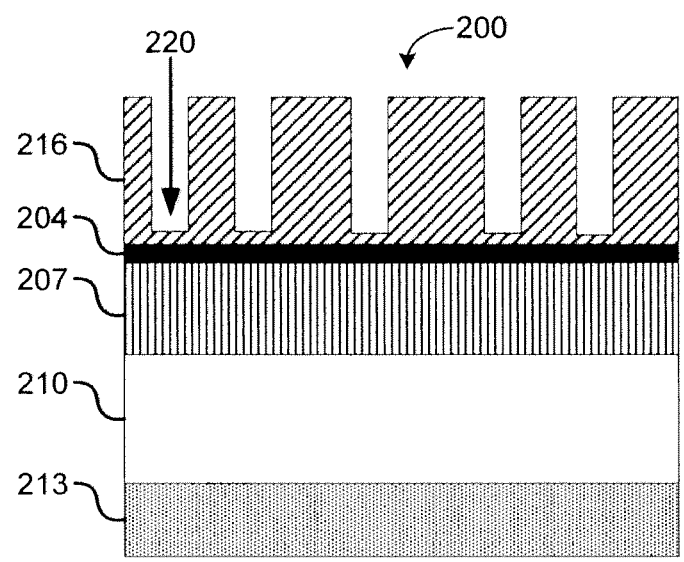

FIGS. 2 and 3 depict an example magnetic recording medium subsequent to operations 101-110. FIG. 2 illustrates a cross-sectional depiction of magnetic recording medium 200 comprising a substrate layer 213, a magnetic recording layer 210, a (thick) carbon layer 207, a (thin) tantalum layer 204, and a photoresist layer 201. FIG. 3 depicts the same magnetic recording medium 200 after photoresist layer 201 has been patterned into photoresist patterned layer 216. It should be noted that at the bottom 220 of the each feature of photoresist patterned layer 216, there remains a thin layer of photoresist layer. In some embodiments, this thin layer of photoresist is removed when the photoresist patterned layer is transferred to the underlying tantalum layer.

Continuing with the method of FIG. 1, at operation 113, the resulting photoresist patterned layer is transferred to the tantalum layer such that the two layers share the same pattern. This results in a tantalum patterned layer that functions as a tantalum mask. The transfer may be performed, for example, by way of a plasma dry etching using fluorine-based gas chemistries, such as $CF_4$, which can etch through a thin photoresist layer (e.g., at 220) and etch the tantalum layer.

Figure 4:
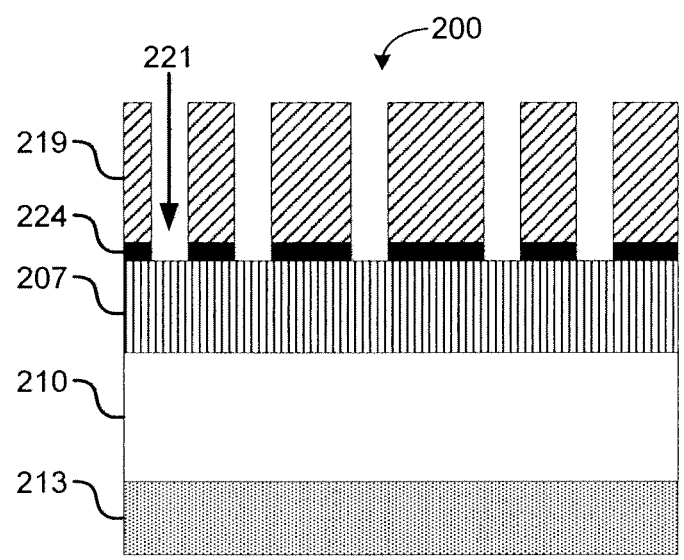

FIG. 4 illustrates magnetic recording medium 200 once photoresist patterned layer 216 has been transferred to tantalum layer 204, resulting in photoresist patterned layer 219 and tantalum patterned layer 224. As depicted, the thin layer of photoresist depicted in FIG. 3 (at 220) is now removed in photoresist patterned layer 219 (see, 221) by way of the dry etch process used to transfer photoresist patterned layer 216 to tantalum layer 204.

Figure 5:
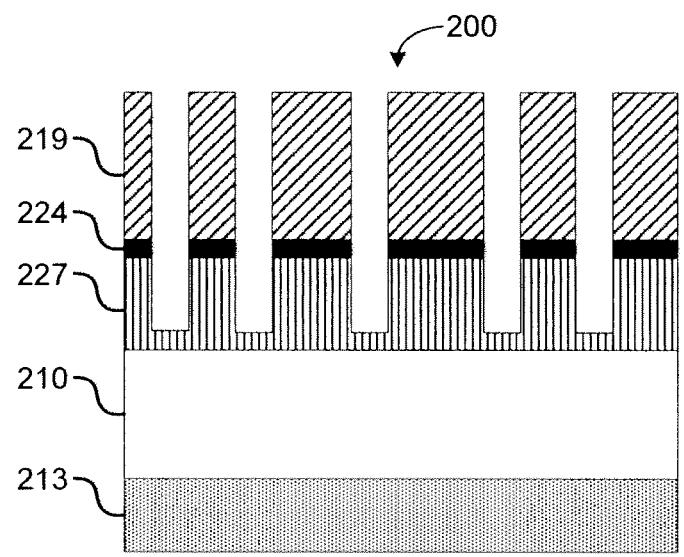

Continuing with the method of FIG. 1, at operation 116, the tantalum patterned layer is transferred to the carbon layer, thereby resulting in a carbon patterned layer that functions as a carbon mask. For example, the transfer may be performed by way of a plasma dry etching using oxygen-base chemistries, such as $Ar-O_2$ plasma, which do not etch the tantalum pattern layer. The carbon layer may be etched such that a residual layer of carbon is left at the bottom of each carbon etch feature; this residual carbon layer is later used to protect the magnetic recording layer when the tantalum patterned layer is later removed (after the ion implantation process). As a result of the thin tantalum mask, a high aspect ratio is maintained in the carbon patterned layer. FIG. 5 depicts magnetic recording medium 200 after tantalum patterned layer 224 is transferred to carbon layer 207, resulting in carbon patterned layer 227.

Optionally, the photoresist patterned layer is removed at operation 119. However, in some embodiments, the etch process used to transfer the tantalum patterned layer to the carbon layer causes most if not all the photoresist patterned layer to be removed. In such embodiments, if portions of the photoresist patterned layer remain after the transfer of the tantalum patterned layer to the carbon layer, those portions would be removed by etch processes subsequent to the implantation process.

Figure 6:
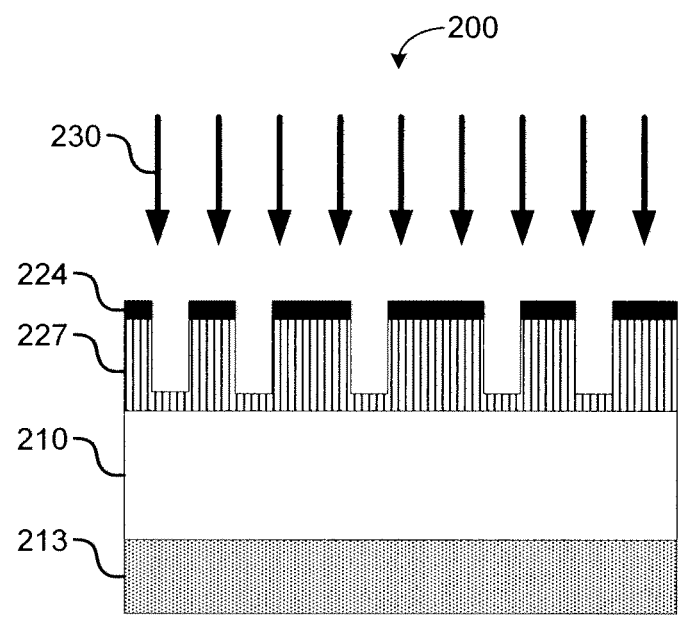

Subsequent to operation 116, the ion implantation process is performed (at operation 122) to pattern the magnetic recording layer. FIG. 6 depicts the ion implantation process 230 being performed on magnetic recording medium 200 after photoresist patterned layer 219 has been removed.

Figure 7:
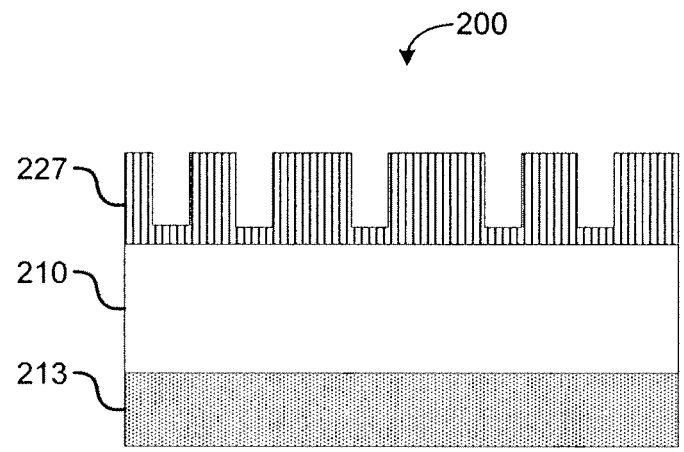
Figure 8:
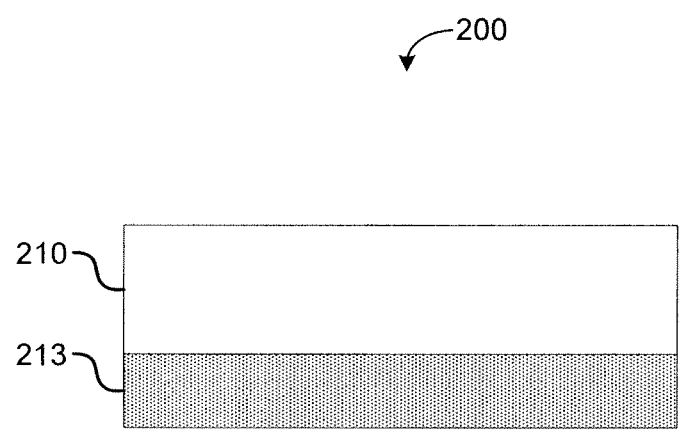

After the implantation process, tantalum (patterned) layer mask 224 and the carbon (patterned) layer mask 227 are removed, as depicted in FIGS. 7 and 8 respectively. Removal may be facilitated using dry etch. For example, the tantalum layer may be removed using fluorine-based gas chemistries (e.g., $CF_4$) and the carbon layer may be removed using hydrogen-based chemistries (e.g., $Ar-H_2$ or $H_2$ plasma). Because a magnetic recording layer can be easily damaged by the $CF_4$ plasma and the etch rate of tantalum using $CF_4$ is higher than the etch rate of carbon, a residual layer of carbon (240) may be left remaining in carbon etch features so that the tantalum layer mask layer can be removed using $CF_4$ before the $CF_4$ completely etches away the residual carbon layer.

As depicted in FIG. 8, once the tantalum layer has been removed, the sole remaining carbon (patterned) layer mask 227 may be removed by dry etching (e.g., Ar—H2 or H2 plasma) with minimal damage to the magnetic recording layer 210.

Figure 9:
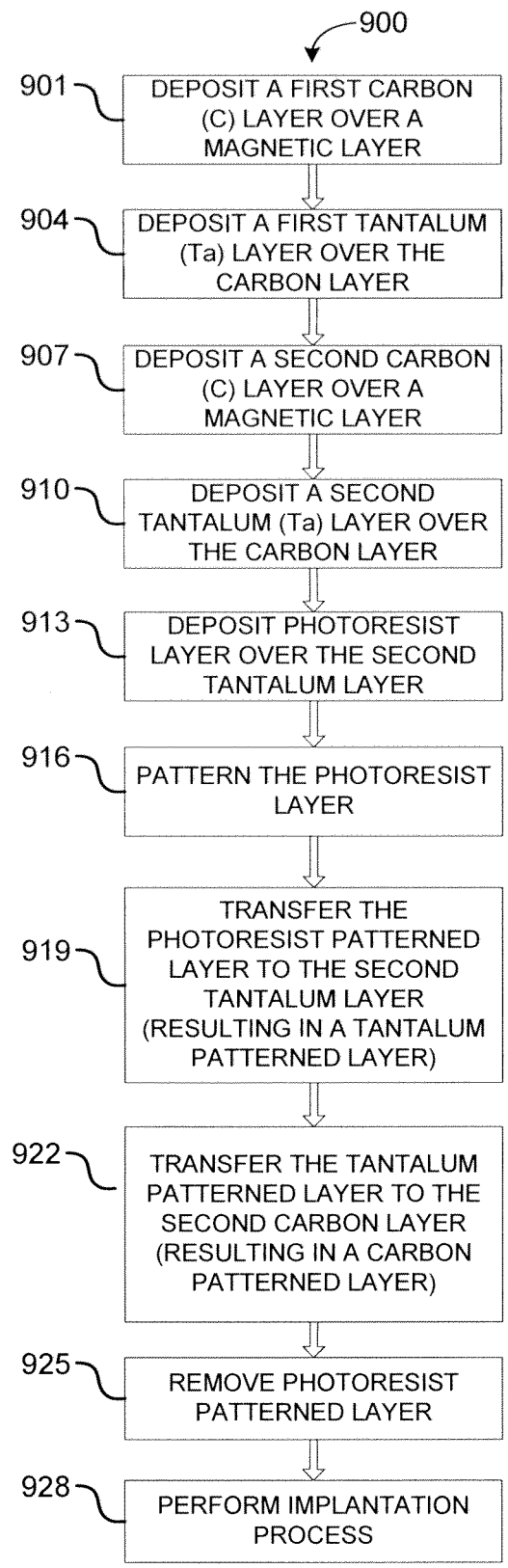
FIG. 9 illustrates a flowchart of a method for manufacturing a magnetic recording medium in accordance with an embodiment of the present invention.

FIG. 9 illustrates a flowchart 900 of an example method for creating magnetic recording media, in accordance with an embodiment, using a hard mask comprising more than one layer of tantalum and more than one layer of carbon (e.g., a dual Ta/C hard mask). The method begins at operation 901 with the deposition of a first carbon (C) layer over a magnetic recording layer of a magnetic recording medium. The first carbon layer will be relatively thin (e.g., ~2 nm) in comparison to other layers of the magnetic recording medium. This is followed by the deposition of a first tantalum (Ta) layer over the carbon layer at operation 904. The first tantalum layer will also be relatively thin (e.g., ~1 nm) in comparison to other layers of the magnetic recording medium. As described later below, in some embodiments, the first carbon layer and first tantalum layer can be useful in the removal of the hard mask layers from the magnetic recording layer after the ion implantation process. Subsequently, operations 907-928 of FIG. 9 mirror operations 101-122 of FIG. 1.

At operation 907, a second carbon (C) layer is deposited over the first carbon layer. The second carbon layer may be deposited using chemical vapor deposition (CVD) and relatively thick (e.g., ~40 nm) in comparison to other layers of the magnetic recording medium. At operation 910, a second tantalum (Ta) layer is deposited over the second carbon layer. Then, at operation 913 a photoresist layer is deposited over the second tantalum layer. At operation 916 the photoresist layer is patterned using a lithographic technique, such as nano-imprint lithography (NIL), thereby resulting in a photoresist patterned layer.

Figure 10:
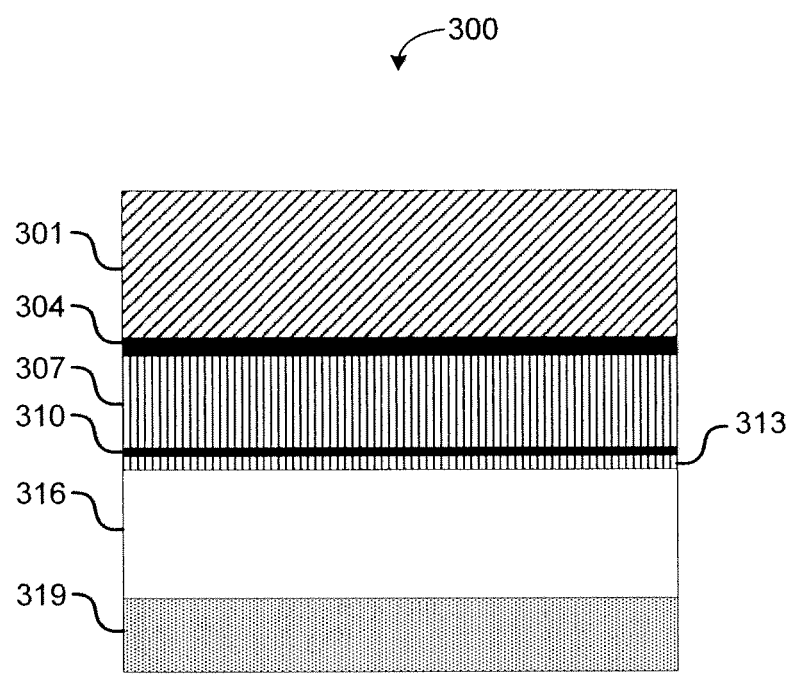
FIGS. 10-18 illustrate a cross-sectional view of a magnetic recording medium being manufactured in accordance with an embodiment of the present invention.
Figure 11:
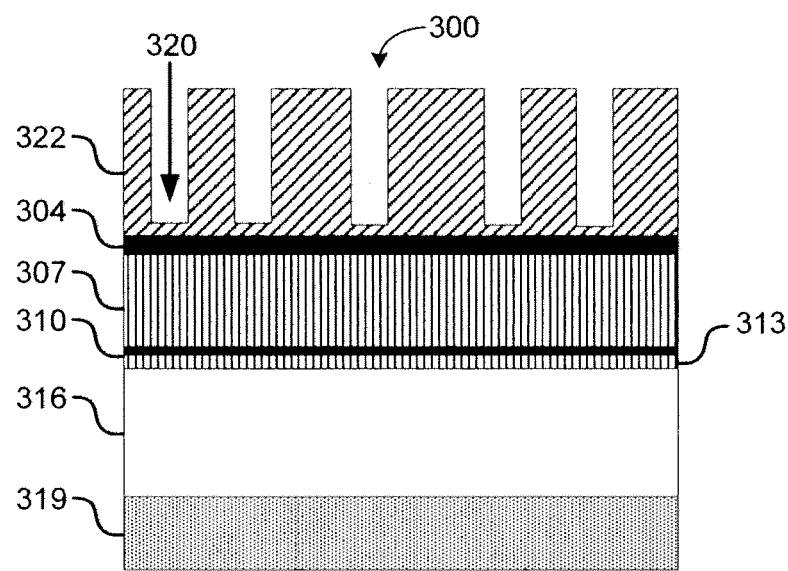

FIG. 10 illustrates the results of operations 901-913 in an example magnetic recording medium 300. Medium 300 comprises a substrate layer 319, a magnetic recording layer 316, a (thin) first carbon layer 313, a (thin) first tantalum layer 310, a (thick) second carbon layer 307, a (thin) second tantalum layer 304, and a photoresist layer 301. FIG. 11 illustrates the result of operation 916, where photoresist layer 301 is patterned into photoresist patterned layer 322. It should be noted that at the bottom 320 of the each feature of photoresist patterned layer 322, there remains a thin layer of photoresist layer. In some embodiments, this thin layer of photoresist is removed when the photoresist patterned layer is transferred to the underlying tantalum layer.

Continuing with FIG. 9, at operation 919, the resulting photoresist patterned layer is transferred to the second tantalum layer such that the two layers share the same pattern. This results in a tantalum patterned layer that functions as a tantalum mask. The transfer may be performed, for example, by way of a plasma dry etching using fluorine-based gas chemistries, such as $CF_4$, which can etch through a thin photoresist layer (e.g., at 320) and etch the second tantalum layer.

Figure 12:
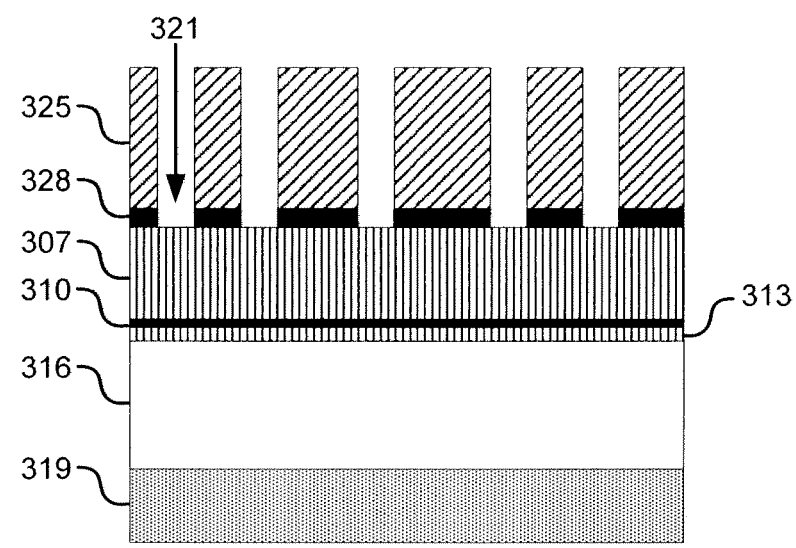

FIG. 12 illustrates magnetic recording medium 300 once photoresist patterned layer 322 has been transferred to second tantalum layer 304, resulting in photoresist patterned layer 325 and tantalum patterned layer 328. As shown, the thin layer of photoresist depicted in FIG. 11 (at 320) is now removed in photoresist patterned layer 325 (see, 321) by way of the dry etch process used to the transfer photoresist patterned layer 322 to tantalum layer 304.

Figure 13:
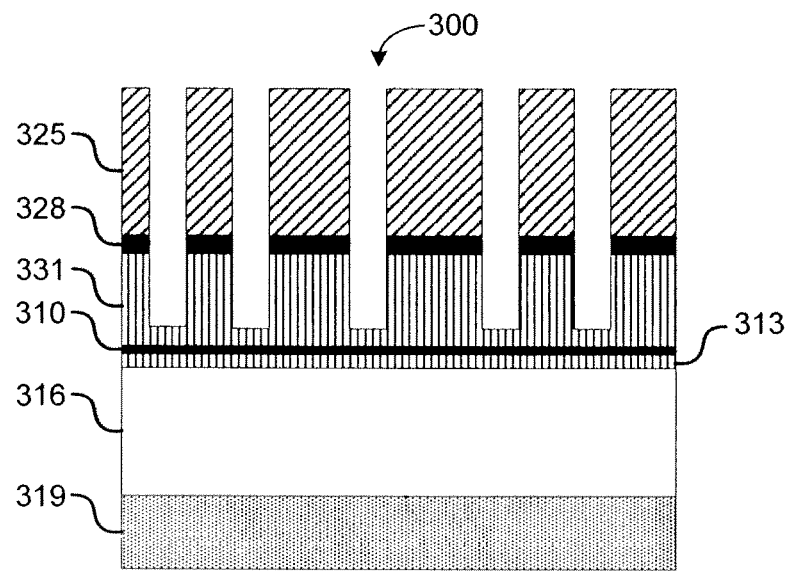

Moving on to operation 922 of FIG. 9, the tantalum patterned layer is transferred to the second carbon layer, thereby resulting in a carbon patterned layer that functions as a carbon mask. For example, the transfer may be performed by way of a plasma dry etching using oxygen-base chemistries, such as $Ar$—$O_2$ plasma, which do not etch the tantalum patterned layer. The carbon layer may be etched such that a residual layer of carbon is left at the bottom of each carbon etch feature. Unlike the method of FIG. 1, this residual carbon layer is no longer needed to protects the magnetic recording layer during hard mask layer removal (after the ion implantation process) but, rather, the first tantalum layer during removal of the second carbon layer. FIG. 13 depicts magnetic recording medium 300 after tantalum patterned layer 328 is transferred to second carbon layer 307, resulting in carbon patterned layer 331.

Figure 14:
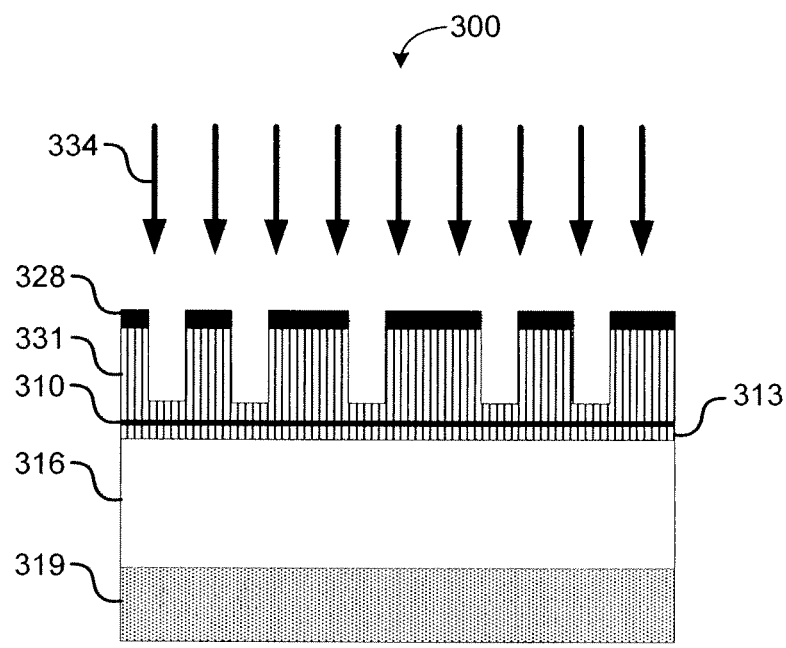

Once the photoresist patterned layer is removed at operation 925, the ion implantation process is performed (at operation 928) to pattern the magnetic recording layer. FIG. 14 depicts magnetic recording medium 300 the ion implantation process 334 being performed on magnetic recording medium 300 after photoresist patterned layer 325 has been removed.

Figure 15:
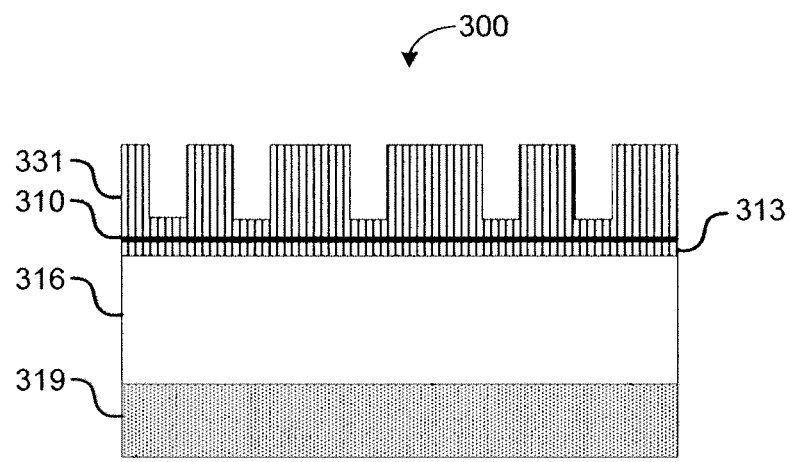
Figure 16:
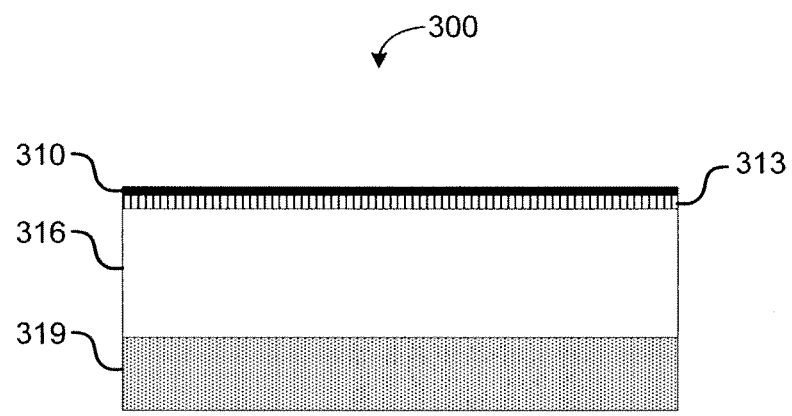

After the implantation process, tantalum (patterned) layer mask 328 and the carbon (patterned) layer mask 331 are removed, as depicted in FIGS. 15 and 16 respectively. As before, removal of tantalum patterned layer 328 and carbon patterned layer 331 can be facilitated using dry etch. For example, the tantalum patterned layer may be removed using fluorine-based gas chemistries (e.g., $CF_4$) and the carbon patterned layer may be removed using hydrogen-based chemistries (e.g., $Ar$—$H_2$ or $H_2$ plasma). First tantalum layer 310 at the bottom of the etched features of tantalum patterned layer 328 and carbon patterned layer 331 is not exposed during the removal of either the tantalum patterned layer because of the residual carbon layer left after the tantalum patterned layer is transferred to the second carbon layer (i.e., after operation 922); the residual carbon layer functions as an etch stop during the etch processes that removes tantalum patterned layer 328. Then, when carbon patterned layer 331 is removed, first tantalum layer 310 function as an etch stop to prevent the etch process that removes carbon patterned layer 331 from damaging the magnetic recording layer.

Figure 17:
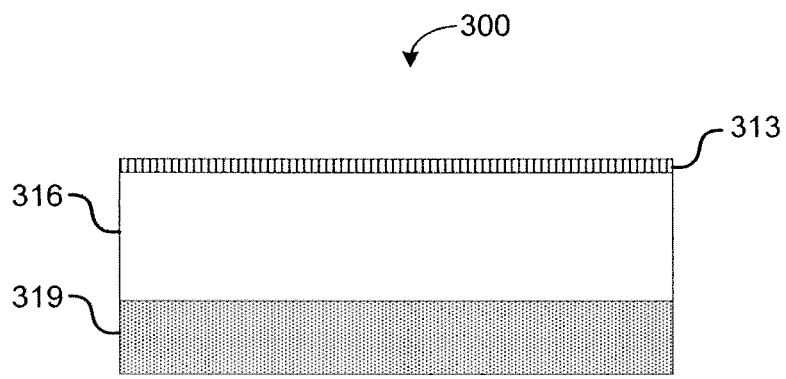
Figure 18:
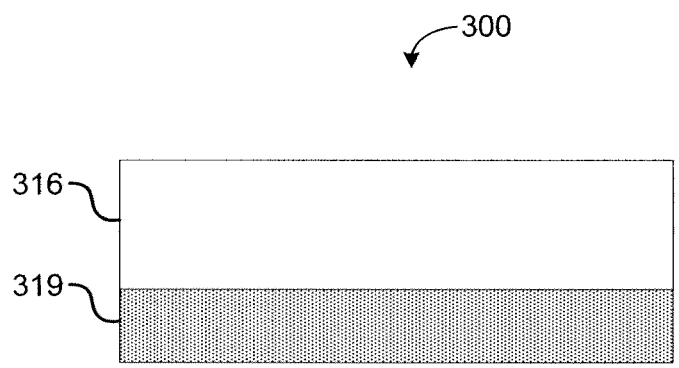

Once the thin tantalum mask (i.e., tantalum patterned layer 328) and the thick carbon mask (i.e., carbon patterned layer 331) have been removed, the first thin tantalum layer (i.e., first tantalum layer 310) and first thin carbon layer (i.e., first carbon layer 313), can be etched away using, for example, a dry etch process (e.g., $CF_4$ and $Ar$—$H_2$ plasma, respectively). FIGS. 17 and 18 respectively depict magnetic recording medium 300 after first tantalum layer 310 is removed and first carbon layer 313 is removed.

Because of the uniform thickness of the first tantalum layer and the first carbon layer, the dry etch process can remove the tantalum layer and carbon layer uniformly without any area of the magnetic recording layer being overly exposed to the etch chemistries used for removal (e.g., $CF_4$ and $Ar$—$H_2$ plasma). The use of the first tantalum layer and the first carbon layer in conjunction with the second tantalum layer and the second carbon layer helps avoid situations where exposure of the magnetic recording layer to etch chemistries used during removal of the carbon (patterned) layer mask (e.g., $Ar$—$H_2$ or $H_2$ plasma) are greater in the etched carbon features (where the residual carbon is much thinner) than the non-etched areas (where the carbon mask is thicker).

In some embodiments, a dual Ta/C hard mask allows for a reduction in feature size from resist mask to Ta/C mask. For example, a 30 nm wide feature in a photoresist mask can be reduced to a 13 nm wide feature in a dual Ta/C mask, thereby alleviating difficulty in fabricating small features. In other embodiments, a dual Ta/C hard mask is extendible to high density or small features, whereby the dual Ta/C hard mask allows for a thick hard mask to stop ions while maintaining small feature dimensions (i.e., high aspect ratio). This is achieved because the first tantalum layer masks the first carbon layer and the first tantalum layer is not etched while the second carbon layer is etched. This in contrast to other approaches, where the hard mask thickness will have to be reduced as features get smaller; these thinner hard masks will not be effective at stopping ions. In further embodiments, a dual Ta/C hard mask exhibits high aspect ratio features with steep side-wall angle, which help to produce sharp transition between implanted and non-implanted region of magnetic layers.

Figure 19:
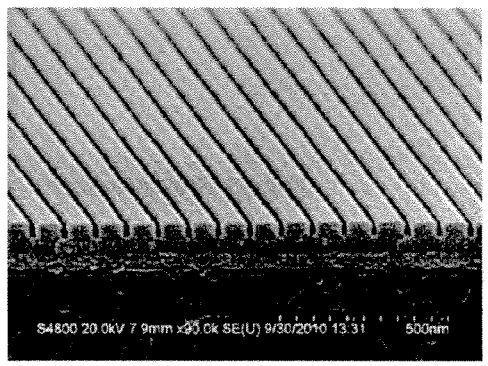
FIGS. 19 and 20 provide electron microscope images of magnetic recording media manufactured in accordance with an embodiment of the present invention.
Figure 19:
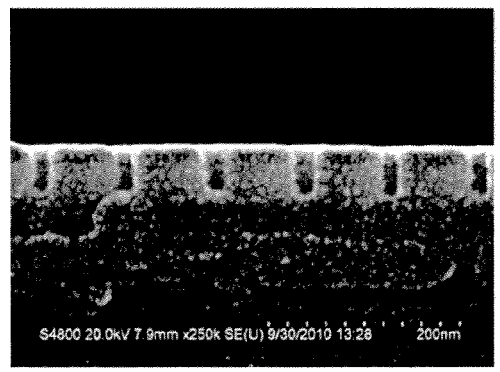

FIG. 19 provides scanning electron microscope (SEM) images of lines etched into a single Ta/C hard mask on a magnetic recording medium to create a discrete track medium (DTM) (perspective view 355, cross-sectional view 357). The groove depth is ~44 nm and the groove width is ~21 nm. In comparison, the original groove width in patterned photoresist used to create the single Ta/C hard mask was ~30 nm. The photoresist is not shown because it was etched away during the etch process that removed the carbon layer.

Figure 20:
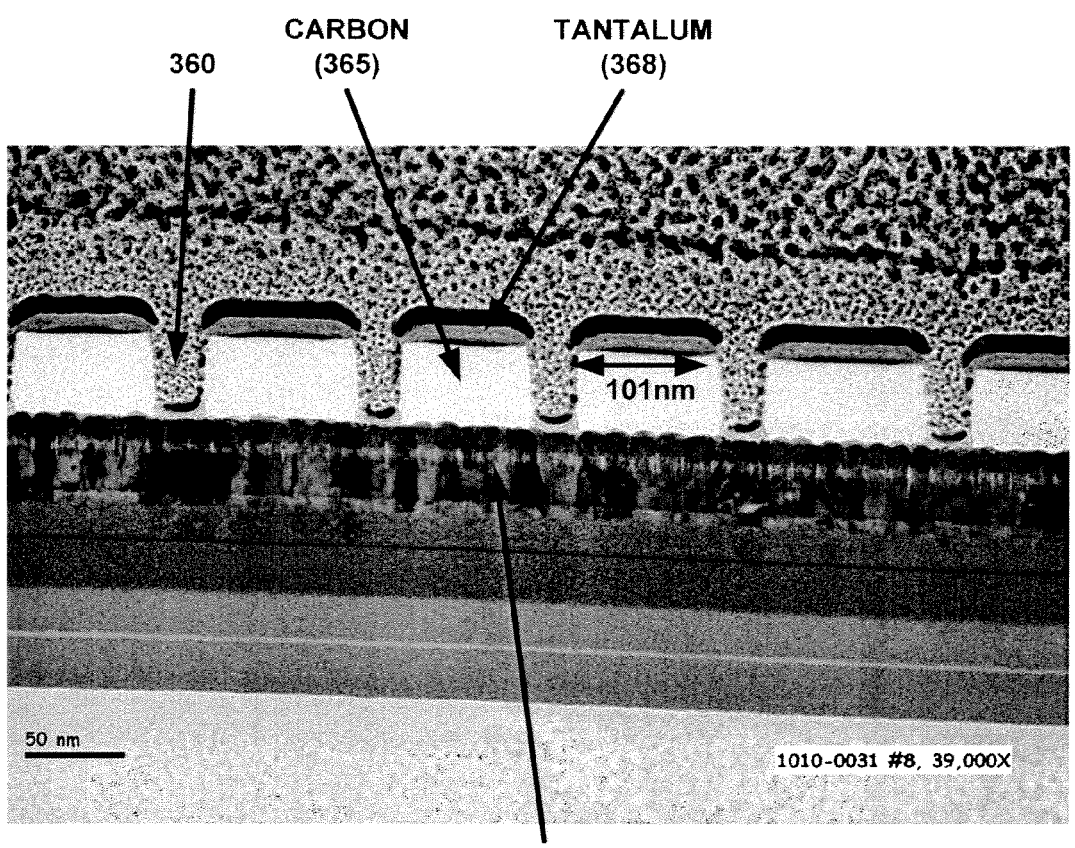

FIG. 20 provides a transmission electron microscope (TEM) image of grooves (360) etched into a single Ta/C hard mask on a magnetic recording medium to create a discrete track medium (DTM). The groove depth is ~44 nm and the groove width is ~21 nm. In contrast, the original groove width of the patterned photoresist used to create the single Ta/C hard mask was ~30 nm. There is no photoresist remaining because it was etched away during the etch process that removed the carbon layer. The sidewall angle is steeper in the etched Ta/C features than in original patterned resist features.

Figure 21:
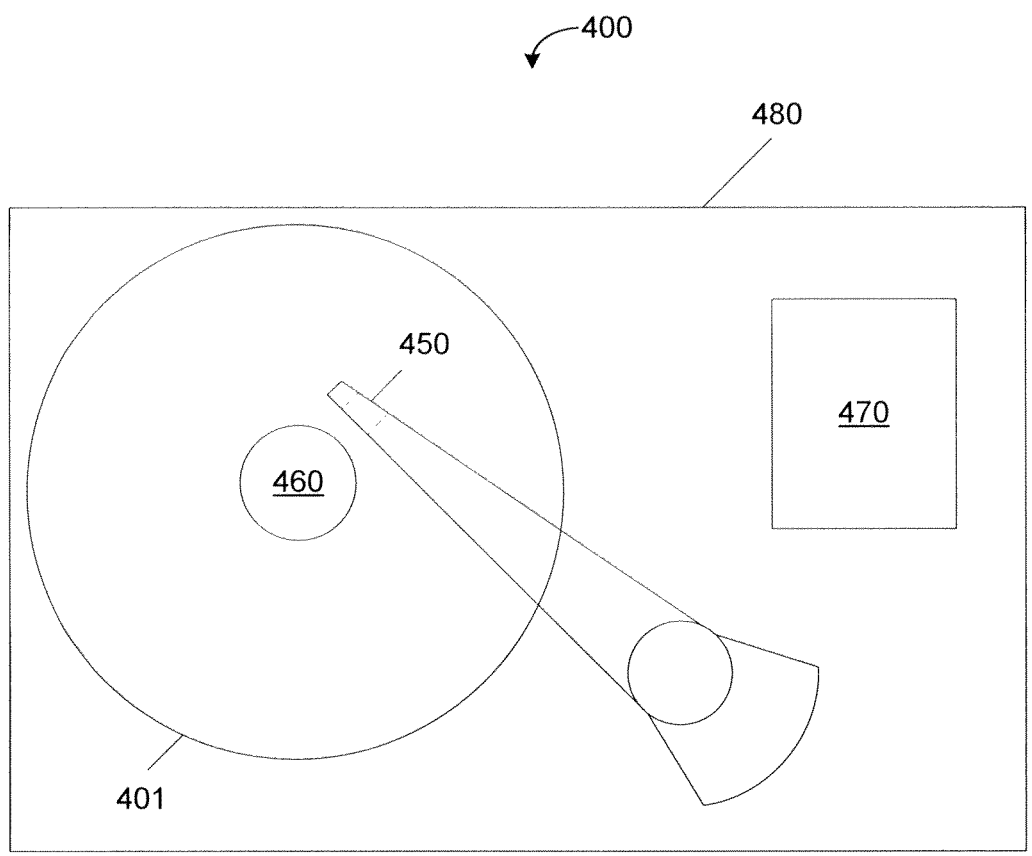
FIG. 21 illustrates a disk drive including a patterned magnetic recording disk fabricated in accordance with one embodiment of the present invention.

FIG. 21 illustrates a disk drive 400 having disk 401. Disk drive 400 may include one or more disks 400 to store data. Disk 401 resides on a spindle assembly 460 that is mounted to drive housing 480. Data may be stored along tracks in the magnetic recording layer of disk 401 which are patterned using methods similar or identical to those discussed herein. For example, disk 401 may be a bit patterned medium (BPM). The reading and writing of data is accomplished with head 450 that has both read and write elements. The write element is used to alter the properties of the perpendicular magnetic recording layer of disk 401. In one embodiment, head 450 may have magneto-resistive (MR), or giant magneto-resistive (GMR) elements. In an alternative embodiment, head 450 may be another type of head, for example, an inductive read/write head or a Hall effect head. A spindle motor (not shown) rotates spindle assembly 460 and, thereby, disk 401 to position head 450 at a particular location along a desired disk track. The position of head 450 relative to disk 401 may be controlled by position control circuitry 470.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A method for manufacturing a magnetic recording medium, the method comprising:
   depositing a first carbon (C) layer over a magnetic layer of the magnetic recording medium;
   depositing a first tantalum (Ta) layer over the first carbon layer;
   depositing a second carbon (C) layer over the first tantalum layer;
   depositing a second tantalum (Ta) layer over the second carbon layer;
   depositing a photoresist layer over the second tantalum layer;
   patterning the photoresist layer to form a photoresist patterned layer;
   transferring the photoresist patterned layer into the second tantalum layer to form a tantalum patterned layer;
   transferring the tantalum patterned layer into the second carbon layer to form a carbon patterned layer; and
   performing an implantation process.

2. The method of claim 1, wherein the first carbon layer has a first thickness and the second carbon layer has a second thickness that meets or exceeds the first thickness.

3. The method of claim 1, wherein the first carbon layer has a thickness of approximately 2 nm.

4. The method of claim 1, wherein the first tantalum layer has a thickness of approximately 1 nm.

5. The method of claim 1, wherein the second carbon layer is etched such that etched features of the second carbon patterned layer have residual carbon layer remaining.

6. The method of claim 1, further comprising removing the second tantalum layer and removing the second carbon layer.

7. The method of claim 6, wherein removing the second tantalum layer comprises dry etching using a fluorine-based gas chemistry.

8. The method of claim 6, wherein removing the second carbon layer comprises dry etching using an oxygen-based gas chemistry.

9. The method of claim 1, further comprising removing the first tantalum layer and removing the first carbon layer.

10. The method of claim 9, wherein removing the first tantalum layer comprises dry etching using a fluorine-based gas chemistry.

11. The method of claim 9, wherein removing the first carbon layer comprises dry etching using a hydrogen-based gas chemistry.

12. The method of claim 1, wherein transferring the tantalum patterned layer to the second carbon layer comprises dry etching using an oxygen-based gas chemistry.

13. The method of claim 1, wherein transferring the photoresist patterned layer to the second tantalum layer comprises dry etching using a fluorine-based gas chemistry.

14. The method of claim 1, wherein the second tantalum layer has a thickness sufficient to still cover the second carbon layer subsequent to the photoresist patterned layer being etched into the second tantalum layer.

15. The method of claim 1, wherein the second tantalum layer has a thickness sufficient to protect the second carbon layer subsequent to the photoresist patterned layer being etched into the second tantalum layer.

16. The method of claim 1, wherein the second tantalum layer has a thickness between approximately 1 nm and 2 nm.

* * * * *